United States Patent [19]

Squires

[11] Patent Number: 5,634,387
[45] Date of Patent: Jun. 3, 1997

[54] PRECISION CUTTING ASSEMBLY

[76] Inventor: Richard D. Squires, 517 Rosebriar Ct., Greensboro, N.C. 27407

[21] Appl. No.: 292,788

[22] Filed: Aug. 18, 1994

[51] Int. Cl.$^6$ ............................................. B26D 1/08
[52] U.S. Cl. .................. 83/468; 83/468.7; 83/522.19; 83/631; 83/828; 83/699.51
[58] Field of Search ....................... 83/468, 468.1, 83/468.2, 468.3, 468.7, 522.18, 522.19, 627, 697, 821, 631, 859, 827, 828, 699.31, 699.41, 699.51, 699.61; 33/630, 641, 710, 813, 818, 31

[56] References Cited

U.S. PATENT DOCUMENTS

| | | | |
|---|---|---|---|
| 81,476 | 8/1868 | Cheney | 83/468.7 |
| 219,681 | 9/1879 | Brady . | |
| 606,261 | 6/1898 | Yates | 83/468.7 |
| 710,085 | 9/1902 | Stevens | 83/468.1 |
| 954,052 | 4/1910 | Seibel . | |
| 957,747 | 5/1910 | Clifton . | |
| 1,416,800 | 5/1922 | Detjen . | |
| 1,419,789 | 6/1922 | Webb . | |
| 1,681,739 | 8/1928 | McLaughlin . | |
| 2,010,009 | 8/1935 | Brightwell | 83/697 |
| 2,071,402 | 2/1937 | Hazelton . | |
| 2,130,818 | 9/1938 | Soderberg . | |
| 2,488,610 | 11/1949 | Stackawicz | 164/89 |
| 3,176,568 | 4/1965 | Bradley . | |
| 3,240,094 | 3/1966 | Van Endert . | |
| 3,376,728 | 4/1968 | Nemessanyi . | |
| 3,491,643 | 1/1970 | Meinholdt . | |
| 3,678,792 | 7/1972 | Dvorak | 83/699.11 |
| 3,803,968 | 4/1974 | Black | 83/620 |
| 4,204,450 | 5/1980 | Le Guelennec | 83/461 |
| 4,581,825 | 4/1986 | Parton | 30/358 |
| 4,794,832 | 1/1989 | Trimble | 83/828 X |
| 4,936,177 | 6/1990 | Ozawa et al. | 83/582 |
| 4,974,306 | 12/1990 | Cole et al. | 83/468 |
| 5,105,703 | 4/1992 | Kondo | 83/636 |
| 5,215,296 | 6/1993 | Adams et al. | 269/60 |
| 5,249,495 | 10/1993 | Renk | 83/468.3 |

FOREIGN PATENT DOCUMENTS

2848554  5/1979  Germany ....................... 83/697

Primary Examiner—Rinaldi I. Rada
Assistant Examiner—Charles Goodman
Attorney, Agent, or Firm—Neil F. Markva

[57] ABSTRACT

A precision cutting assembly comprises a frame, a material support table mounted to the frame and a cutting blade for cutting sheet stock material. A cutting blade carrier is mounted to the frame for movement along a linear path. Pressure producing elements contiguously hold the cutting blade carrier within precise parallel limits of movement along the linear path. The cutting blade carrier causes the cutting blade to accurately cut precision segments from a sheet of material disposed on the material support table. A precision measuring mechanism includes a precision threaded rod member and an indicating element mounted to move along a linear scale upon rotation of the precision threaded rod member. A circumferential scale has a plurality of marks spaced from a circumferential zero point and spaced to indicate a preselected amount of rod member rotation between adjacent circumferential marks. The linear scale includes a plurality of measuring marks spaced from a linear zero point and laterally spaced with respect to each other along the linear scale for a linear distance that corresponds to a complete rotation of the precision threaded rod member.

34 Claims, 7 Drawing Sheets

PRECISION CUTTING ASSEMBLY

FIELD OF THE INVENTION

This invention relates to the field of measuring and cutting material in a precision manner. More particularly, the invention relates to the precision cutting of flat sheets of various materials used in the hobby trade and more specifically, in detailed model-making.

BACKGROUND OF THE INVENTION

Many people are in all types of hobbies such as model railroading, model ship building, model car building, model airplane building, all types of military modeling, and many types of crafts. All of these people have one thing in common: they all try to achieve the art of building scale models in an exact, beautiful, and down to the last detail manner. To do this, they spend many tedious hours of painstaking, eye-straining work.

In a particular example, scale model railroad building includes reproduction of steam locomotives from stock sheet brass and structures such as buildings and towers of heavy card stock down to paper. Modeling in brass requires a vise, ruler, tin snips, file, jewelers saw, and the modelers eyesight. When modeling in a medium other than metal, an Exacto® knife or saw is used. The prior art related to cutting and handling of materials has changed very little in the past 50 years.

Hobbyists currently use scissors, razor blades, and/or specialty knives such as an Exacto® knife for cutting various kinds of sheet material in performing their hobby. The accuracy of any cut made using these prior art cutting instruments depends on the hobbyist's ability to measure properly and evenly cut along a particular line using a straight edge such as a ruler as a guide.

Various materials require the use of different types of scissors such as scissors for cutting paper, card stock, flexible and rigid plastic material, and metal sheets. The metal sheets require the use of metal cutters generally known as tin snips. Various types of razor or knife blades are used to cut sheets of card stock, cork, and various types of plastic materials such as Styrene.

Difficulty is generally encountered when cutting sheet stock having a thickness of up to about 1/16th to 1/8th of an inch. For example, a thicker piece of Styrene may require several passes of a blade along the cutting line to make the desired cut. When the blade slips out of the original cut either the sheet is ruined or an uneven edge on the cut piece is produced. Neither condition is desirable to a hobbyist.

When using scissors or blades to cut very thin sections from sheets of metal material such as bronze, brass, aluminum, tin, and the like, often the thinly cut segments curl up onto themselves. When this occurs, it is extremely difficult and in some cases impossible to use the curled segments for constructing a model. This is particularly true, for example, when modeling such things as model railroad engines and cars.

Because of such problems, many modelers use pre-cut kits that simply require assembly. Those who desire to build models from "scratch", however, have particular difficulty in cutting such thin pieces from a larger sheet of stock material often resulting in significant frustration.

When breakage or inaccurate and incomplete cuts occur, the sheet of material may become scrap without its original edges and corners. Once the original straight edges and square corners are gone, the equally important aspect of accurate measuring before cutting the sheet stock is precluded causing the sheet to be scrapped.

The existing method used by modelers for measuring and cutting segments from sheet stock is laborious. First, they accurately measure the width to be cut from a sheet stock and mark the sheet surface along a straight edge to designate the cutting line. With one hand, the straight edge is pressed against the sheet while the other hand guides a cutting blade along the line and against the straight edge. The modeler must hold the straight edge tightly against the sheet stock and carefully apply cutting pressure to the blade. If the straight edge moves or for some reason the cutting blade deviates from the cutting line, the modeler may have to make another cut from the same or another sheet of material.

Because the current cutting and measuring process in the hobby industry is most painstaking, a person's ability to model is completely dependent on the person's skill in manually holding the straight edge and the sheet being cut against a support surface while carefully and accurately guiding a cutting blade along a manually measured cut line.

Known cutting and measuring devices are shown in U.S. Pat. Nos. 219,681; 954,052; 957,747; 1,416,800; 1,419,789; 1,681,739; 2,071,402; 2,130,818; 2,488,610; 3,176,568; 3,240,094; 3,376,728; 3,491,643; 3,803,968; 4,204,450; 4,581,825; 4,936,177; and 5,105,703. None of these prior art devices are useful for effecting the degree of accuracy and precision required in modeling detailed structures.

Furthermore, none of the disclosed assemblies shows a hand-turned lever crank mounted to move a cutting blade up and down and enables work to be cut at either side of a cutting blade using abutment means on opposing sides of the cutting blade. None of the prior art references show a screw turned with a hand-manipulated lever mechanism. And they disclose no device whereby a cutting edge is displaced a spaced distance from the center of a rotatable drive screw.

PURPOSE OF THE INVENTION

The primary object of the invention is to provide a method and an assembly for cutting accurately measured segments from rigid sheet stock up to at least a sixteenth of an inch thick depending on the composition of the sheet material while still being able to cut accurately through thin flexible sheet material.

A further object of the invention is to provide an apparatus for measuring and cutting a part to an accuracy of 0.001 of an inch by simply turning a knob and rotating a crank handle.

Another object is to provide an assembly that removes the problem of eyestrain on close measurements, and cuts the edges straighter than any modeler thought possible.

Another object of the invention is to provide a precision cutting assembly enabling modelers to significantly increase their productivity and accurateness when cutting segments from sheet stock for reproducing finely detailed models.

A further object of the invention is to provide a method and an apparatus for salvaging otherwise scrap sheet stock material by accurately cutting straight lines and square corners from which further precisely measured segments may be accurately produced.

A still further object of the invention is to enable more hobbyists to become "scratch" modelers through the use of the disclosed method and apparatus for precisely measuring and cutting both flexible and rigid sheet stock without the problems associated with currently existing manual techniques.

SUMMARY OF THE INVENTION

The invention is directed to a precision cutting assembly including frame means, material support means, and cutter means. The support means includes a cutting edge structure and is mounted to the frame means. The cutter means includes cutting blade means mounted to cutting blade carrier means for cutting material that is disposed on the material support means. The frame means defines a linear path and the cutting blade carrier means is mounted to the frame means to move along the linear path.

Pressure producing means contiguously holds the cutting blade carrier means to move within precise parallel paths of movement along the linear path. Drive means move the cutting blade carrier means along the linear path during a cutting operation into and out of a cutting zone located adjacent the cutting edge structure. The cutting blade carrier means is effective to cause the cutting blade means to precision cut segments from material disposed over the cutting edge structure as the cutting blade means moves through the cutting zone defined by the thickness of the material being cut.

The precision cutting assembly comprises frame means, workpiece support means, and tool means for performing a work operation on a workpiece disposed on the workpiece support means. Workpiece setting means locates the workpiece with respect to the tool means for performing the work operation. The workpiece setting means includes linear scale or graduated means, indicator means, indicator carrier means, and precision threaded rod means.

The threaded rod means has at least one threaded rod member rotatably mounted for moving the indicator carrier means along a linear path. Rod rotating means turns the threaded rod member about a fixed axis of rotation. The indicator means is mounted to move with the indicator carrier means that moves along the linear path upon rotation of the threaded rod member.

The rod rotating means includes a circumferential scale means having a circumferential zero point and a plurality of indicating marks spaced from the circumferential zero point and spaced with respect to each other for indicating a preselected amount of rod member rotation between adjacent circumferential marks.

The linear scale or graduated means includes a linear zero point and a plurality of measuring or rotation counting marks spaced from the linear zero point. The measuring or rotation counting marks are laterally spaced with respect to each other along the linear scale or graduated means for a linear distance that corresponds to a complete rotation of the threaded rod member. The preselected amount of rod member rotation designates a corresponding linear amount of movement of the indicator means along the linear scale means.

In a specific embodiment, the linear scale means includes a delimited scale or elongated member having a zero point at each end thereof and a set of equally spaced measuring marks disposed between the end zero points. The tool means includes an elongated cutting blade member for cutting segments from sheet material in a cutting operation. The workpiece setting means includes guide means having a workpiece abutting surface against which the sheet material is disposed during the cutting operation. The indicator means designates on the linear scale or graduated means distance between the abutment surface and cutting blade and, therefore, the size of a segment being cut from the sheet material.

More specifically, the elongated cutting blade member has a straight cutting edge extending in a first direction for cutting segments from a sheet of material in a cutting operation. A first sheet abutting surface is located on a first side of the cutting edge and a second sheet abutting surface is located on a second side of the cutting edge opposite the first side.

The first sheet abutting surface is used to guide a juxtaposed sheet of material that is disposed in a direction transverse to the first direction of the cutting edge. The second sheet abutting surface limits movement of the sheet of material to a delimited distance past the cutting edge to define the measured size of the segment being cut from the sheet of material.

In a specific embodiment, a linear guide member includes a first sheet abutting surface adjacent the linear scale or graduated means. An abutment member includes a second sheet abutting surface. The abutment member is adjustably mounted to the indicator carrier means for moving the abutment member in tandem with the indicator means when the indicator carrier means moves along the linear path upon rotation of the threaded rod member.

In a specific embodiment, the frame means of the precision cutting assembly includes base frame means and two laterally spaced tool carrier support frame structures mounted to opposing sides of the base frame means. The support frame structures define a vertically disposed linear path. Cutting blade means are secured to a carrier body having two outer end portions mounted for sliding contact with respective carrier support frame structures back and forth along the linear path.

More specifically, the linear path defines the movement of the carrier body in a vertical disposition and the material support means is effective to horizontally support the material being cut. The pressure producing means includes pressure bearing surface means located on the respective carrier support frame structure and contiguous to the carrier body for applying pressure against the carrier body in a direction perpendicular to the vertical disposition of movement.

From a different perspective, the carrier body has a longitudinal axis that is perpendicular to the carrier support frame structures. The pressure bearing surface means is located on the respective carrier support frame structures and contiguous to the carrier body for applying pressure against the carrier body. The pressure is applied in a first direction perpendicular to the longitudinal axis of the carrier body and in a second direction parallel to the longitudinal axis of the carrier body.

In the specific embodiment, each of the carrier support frame structures includes guide slot means that receives a respective outer end portion of the carrier body having a longitudinal axis that is perpendicular to the carrier support frame structures. The pressure bearing surface means applies pressure against the carrier body in a direction parallel to the longitudinal axis of the carrier body. The base frame means includes horizontally disposed side frame elements. Each carrier support frame structure includes a vertically disposed carrier support side frame element each having a longitudinal axis, a bottom end portion fixedly secured to respective side base frame elements, and a top end portion fixedly secured to a top carrier support frame structure.

The guide slot means includes a recessed slot extending parallel to the longitudinal axis of each elongated carrier support frame element. The recessed slot has a depth that is less than the thickness of the carrier support frame element, a width sufficient to contain an outer end portion of the carrier body, and an upper end opening to receive the outer end portion into the recessed slot.

The pressure producing means includes first and second plate members located at each outer end portion of the carrier body. The plate members include respective first and second pressure bearing surfaces contiguous to a carrier outer surface portion at each end of the carrier body. The first plate member is fixedly secured to the carrier support frame element adjacent the recessed slot for applying pressure against a first surface of the carrier body and in a direction perpendicular to the longitudinal axis of the carrier body. The second plate member is floatingly disposed in the recessed slot and contiguous the carrier body for applying pressure against a second surface of the carrier body in a direction parallel to the longitudinal axis of the carrier body.

More particularly, the pressure producing means includes pressure plate means juxtaposed opposed outer end faces of the carrier body. Fixed pushing means urge the pressure plate means in a direction parallel to the longitudinal axis of the carrier body. The carrier body has a cutting blade carrying portion and two outer end portions mounted for sliding contact with respective carrier support frame structures. The cutting blade means includes an elongated cutting blade member fixedly secured to the cutting blade carrying portion that faces the material support means. The blade member has a length extending parallel to the longitudinal axis of the carrier body.

The cutting edge structure of the workpiece support means includes a cutter end contact edge against which the cutting blade member passes during the cutting operation. The cutting blade member has a cutting blade edge and a forward abutting surface that is in sliding contact with the cutter end contact edge during the cutting operation. The cutting blade edge is in a tapered disposition from the one end of the blade member to the other to produce a shearing effect between the blade member and the cutter end contact edge during a cutting stroke through the material being cut. In a specific embodiment, the cutting blade edge is straight and the tapered disposition is formed by a drop of the cutting edge in a range of from about 1/10th to about 1/16th of an inch measured along 6 inches of the cutting blade edge.

From another perspective, the frame means includes base frame means and two laterally spaced carrier support frame structures each having a lower end portion mounted to the base frame means and a top end portion mounted to a top carrier support frame structure. The drive means includes elongate drive rod means having a precision threaded outer surface means intermediate a coupling end portion and a drive end portion. The coupling end portion is operatively connected to the cutting blade carrier means and the drive end portion is connected to rotation activating means. The top carrier support frame structure includes a threaded bore having a precision threaded inner surface means for engaging the precision threaded outer surface means of the drive means. The threaded bore extends through the top carrier support frame structure and has a longitudinal axis that is disposed in a direction parallel to the linear vertical path.

More specifically, the rotation activating means includes manually operated handle means fixedly connected to the rotation drive end portion for rotating the drive rod means through the threaded bore of the top carrier support frame structure. The coupling end portion of the drive rod means includes bearing means for engaging the cutting blade carrier means to move the blade carrier means back and forth or up and down along the linear path.

The drive rod means includes an elongate rod member having a shaped rod end bearing surface located at a coupling free end of the rod member. The rod end bearing surface is in frictional contact with a corresponding opposed rod end bearing receiving surface that is disposed on the blade carrier means. The coupling end portion includes coupling bearing means including bracket bearing surface means that engages bracket means mounted to the blade carrier means. On rotation of the rod member during the cutting operation, either the rod end bearing surface pushes the blade carrier means in a cutting direction toward the cutting edge structure or the bracket bearing surface means pulls against the bracket means in a retrieving direction away from the cutting edge structure.

More particularly, the coupling bearing means includes a coupling bearing member having a tubular section with an inner bore surface and lock nut means. The inner bore surface is threadingly engaged with precision threads on the threaded drive member and the lock nut means secures the coupling bearing member at a fixed location on the threaded drive rod member. The tubular section includes an outer annular flange portion that carries the bracket bearing surface means in contact with the bracket means. The carrier body has a bracket recess means with the bracket means fixedly disposed thereover. The bracket recess means includes the rod end bearing receiving surface and has a structural configuration to accommodate the outer annular flange portion of the coupling bearing member.

Another feature of the invention is directed to the material support means that includes flat plate means for supporting a sheet stock workpiece and indicator guide means for directing a measured amount of the workpiece toward the cutting means. The indicator guide means includes indicator means, indicator carrier means, and elongated linear scale or graduated means. The indicator carrier means includes precision threaded rod means rotatably mounted to the frame means for moving the indicator means a predetermined amount along the linear scale or graduated means for each rotation of the threaded rod means. The linear scale or graduated means includes a plurality of measuring or rotation counting marks laterally spaced to designate the predetermined amount for each complete rotation of the threaded rod means from a zero linear starting point.

More specifically, the indicator carrier means includes rod rotating means for turning the threaded rod means about a fixed axis of rotation. The rod rotating means includes a circumferential scale having a zero circumferential point and a plurality of circumferential indicating marks spaced with respect to each other by a circumferential amount which designates a predetermined linear amount of movement of the indicator means along the linear scale means.

In a specific embodiment, the circumferential amount of movement between spaced circumferential indicating marks on the circumferential scale measures an amount equal to one thousandths of an inch along the linear scale means. The indicator means includes an indicating element that points to a particular location on the linear scale or graduated means. The linear scale or graduated means includes a plurality of laterally spaced measuring or rotation counting marks. The space between linear measuring or rotation counting marks corresponds to a single complete rotation of the threaded rod means. Thus, the total number of measuring or rotation counting marks moved by the indicating element corresponds to the total number of rotations of the threaded measuring rod means. The indicating marks on the circumferential scale means determines and measures the amount of linear movement by the indicating element between rotation counting marks on the linear scale means.

In other words, the circumferential scale means includes a plurality of circumferential marks for designating a fractional amount of a complete rotation between a pair of successive rotation counting marks upon a partial rotation of the threaded measuring rod means. Thus, the indicator means together with the circumferential scale means designates on the linear graduated means a corresponding linear amount of relative movement between the workpiece and the tool for precision locating the workpiece on which a work operation is to be performed.

Regarding the specific handling of sheet material to be cut, the material support means includes guide means and abutment means. The guide means is on a first side of the cutting blade means for directing a measured amount of the sheet stock workpiece past the cutting blade. The abutment means is on a second side of the cutting blade means opposite the first side for limiting movement of the material past the cutting blade. The distance between the abutment means and cutting blade defines the measured amount of the material to be cut.

More specifically, the material guide means includes linear indicating means, indicator carrier means, precision threaded rod means, and linear scale means. The linear indicating means is mounted to the indicator carrier means on the first side of the cutting blade means and the abutment means is mounted to the indicator carrier means on the opposite second side of the cutting blade means. The precision threaded rod means is rotatably mounted to the frame means for moving the indicator carrier means with the linear indicating means a selected distance along the linear scale means. The linear indicating means and abutment means move in tandem when the threaded rod means turns about a fixed axis of rotation, which is shown to be coextensive with the longitudinal axis of the rod means.

Another feature is directed to indicator carrier means that includes adjustment means mounted for variably setting the location of the abutment means with respect to the cutting blade means and the carrier indicator means. The cutting blade means includes a blade member having a straight cutting edge extending in a direction perpendicular to the linear vertical path of movement for the carrier blade. The indicator guide means includes first guide element means having a first material abutting surface that extends in a direction perpendicular to the cutting edge. The abutment means includes a second material abutting surface that extends in a direction parallel to the cutting edge.

Base frame means has two laterally spaced side base frame elements and tension rod means for urging the two base frame elements toward each other. This feature enhances the stability of the apparatus to ensure the free movement and precision cutting ability of the cutting blade.

The assembled frame means, material support means, cutter means, pressure producing means and drive means have a structural configuration effective to be portable by a single individual. Thus the hobbyist may adapt the use of invention to virtually any location convenient to effecting his hobby.

The method of the invention is directed to the operation of the disclosed measuring and cutting apparatus.

BRIEF DESCRIPTION OF THE DRAWINGS

Other objects of this invention will appear in the following description and appended claims, reference being made to the accompanying drawings forming a part of the specification wherein like reference characters designate corresponding parts in the several views.

FIG. 8 is an exploded perspective view of an embodiment of the cutting head assembly of the invention without a tension bar on the frame structure of the assembly;

DETAILED DESCRIPTION OF THE INVENTION

Figure 1:
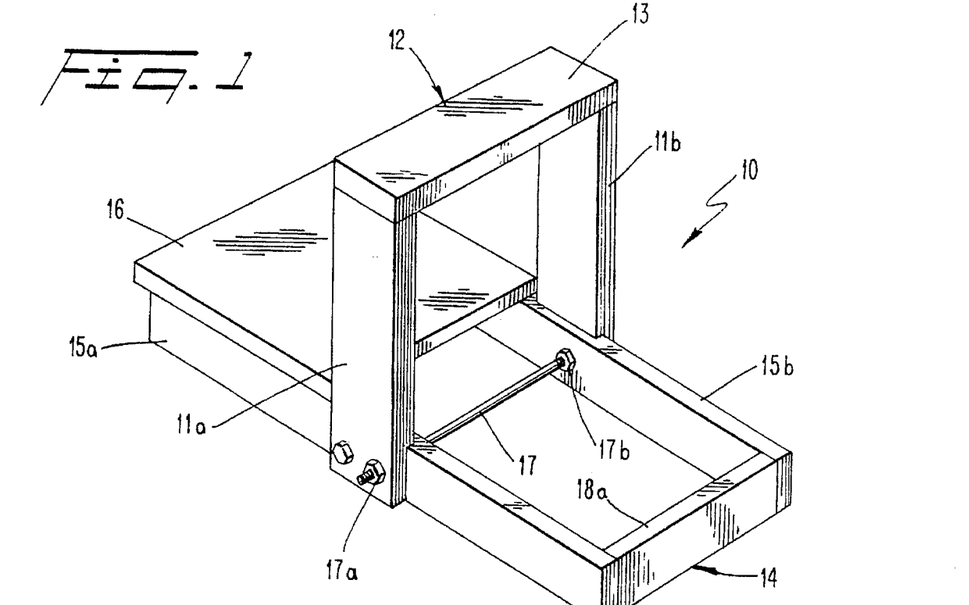
FIG. 1 is a perspective view of the cutting assembly frame structure of the invention without showing the novel measuring system and cutting blade carrier assembly for clarification.
Figure 7:
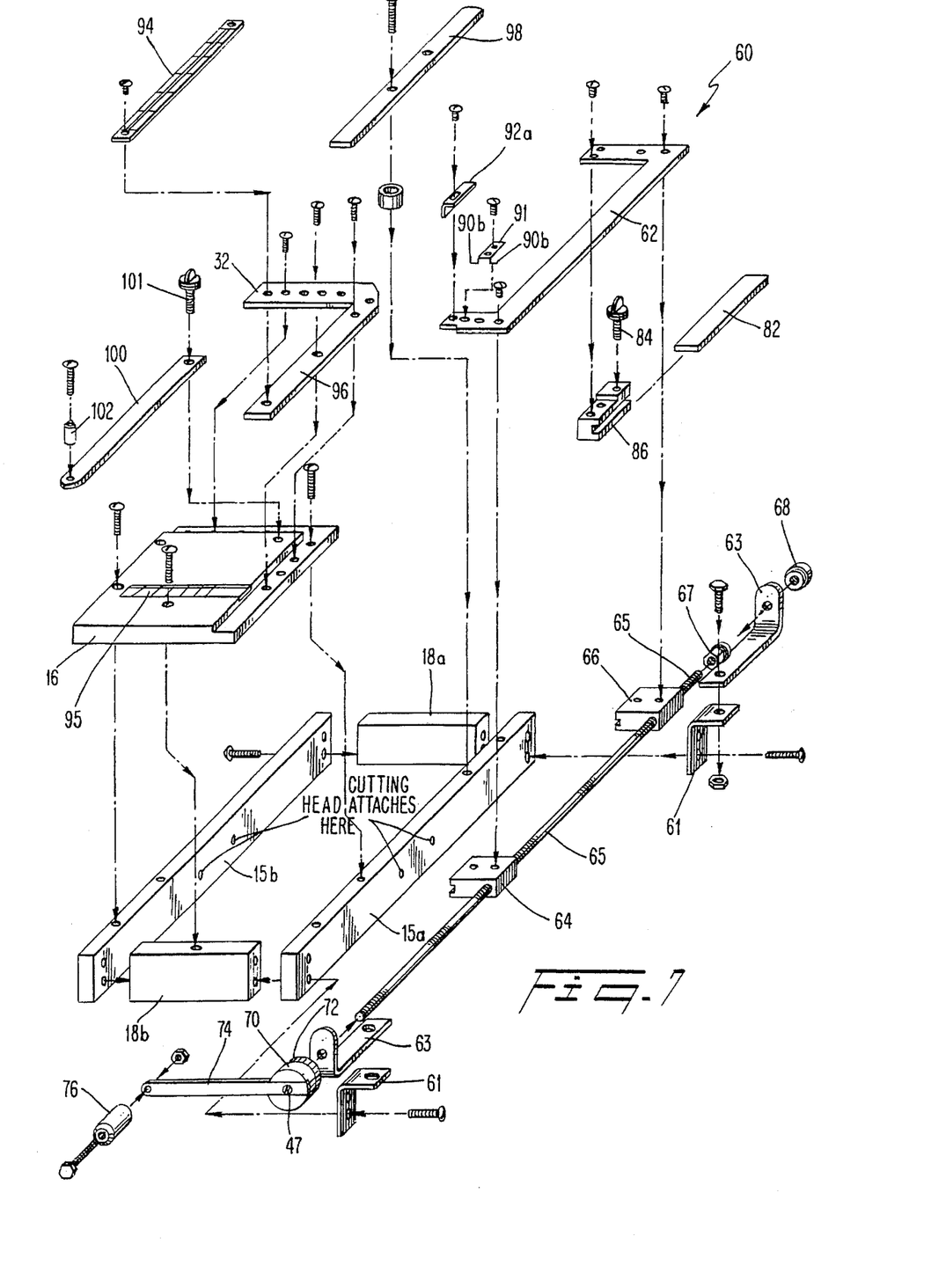
FIG. 7 is an exploded perspective view showing embodiment of a measuring system of the invention.

In FIG. 1, the assembly, generally designated 10, includes a frame structure, generally designated 14, having side base frame elements 15a and 15b attached to end frame elements 18a and 18b (FIG. 7). Cutting head frame assembly, generally designated 12, includes a top plate 13 connected to side elements 11a and 11b that are fixed to respective base frame elements 15a and 15b.

In the embodiment of FIGS. 2–8, two bolts 19 secure the bottom portion of each side frame element 11a and 11b to base frame members 15a and 15b. Drilled and tapped holes in frame elements 15a and 15b receive ⅜-16 bolt (⅜ of an inch diameter, 16 threads per inch) with two oversized holes drilled in cutting head frame elements 11a and 11b to allow adjustment during assembly of the cutting head frame apparatus. Tension bar 17 keeps the base side frame elements 15a and 15b from flexing under a heavy load on the cutting head and are generally sufficient for manually operating cutting head assemblies of the invention.

When a motor driven unit is used to move a cutting blade carrier head 20 up and down between side frame members 11a and 11b, however, a force of 10 thousand pounds or more might be exerted on the cutting head assembly 12. Consequently, base frame elements 15a and 15b could flex up to 3 or 4 thousandths of an inch causing a loss in downward force due to increased friction on the ends of cutting blade carrier head 20. Tension bar 17 provides added means for preventing such flexing of the frame assembly under these conditions.

The ⅜-16 threaded tension bar 17 extends through the two rear clearance holes in base frame elements 15a and 15b. Nuts secure tension bar 17 on the outside of cutting head side frame elements 11a and 11b and lock nuts fix tension bar 17 in place on the inside of base side frame elements 15a and 15b.

With tension bar 17, cutting head frame assembly 12 is first adjusted and bolted with two front bolts 19. Nuts 17a are then tightened on tension bar 17 creating an inward tension on base side frame elements 15a and 15b. Inside lock nuts 17b are then tightened to secure elements 11a and 11b to respective base frame members 15a and 15b. The holes in elements 11a and 11b are clearance holes. Use of tension bar 17 will also ensure a smoother operating unit when using manual force with cutting blade handle assembly 40 shown in FIGS. 2–8.

FIGS. 2–8 show a cutting head assembly 12 having a top frame plate 13 secured by bolts 13a to two laterally spaced tool carrier support frame structures 11a and 11b mounted to opposing sides of base frame elements 15a and 15b with bolts 19. Each frame structure 11a and 11b has a guide slot 21 that receives a respective outer end portion 22 of carrier body 20 having a longitudinal axis A that is perpendicular to frame structures 11a and 11b.

Each vertically disposed frame element 11a and 11b has a longitudinal axis 11c, an end portion 11d fixedly secured to respective base frame elements 15a and 15b, and a top end portion fixedly secured to top frame element 13.

A recessed slot 21 extends parallel to longitudinal axis 11c of each elongated frame element 11a and 11b. Slot 21 has a depth that is less than the thickness of frame elements 11a and 11b, a width sufficient to contain an outer end portion 22 of carrier body 20, and an upper end opening to receive end portion 22 into recessed slot 21.

Pressure plate members 25 and 26 are located at each outer end portion 22 and include respective pressure bearing surfaces 25a and 26a contiguously disposed to an outer end surface of carrier body 20. Plate members 26 are fixedly secured by bolts 28 to respective frame elements 11a and 11b adjacent recessed slot 21. Plate members 26 apply pressure against a first surface of carrier body 20 in a direction perpendicular to its longitudinal axis A.

A plate member 25 is disposed in each recessed slot 21 of frame elements 11a and 11b. Bearing surface 25a applies pressure against an outer end surface of carrier body 20 in a direction parallel to its longitudinal axis A. Pushing bolts 27 urge pressure plate members 25 toward the end surfaces of carrier body 20. As is evident in the drawings and as described herein, plate members 25 are floatingly disposed in slots 21 in that they are unconnected to any structure and freely adjustable along their respective surfaces through the action of pushing bolts 27. Once the pressure is evenly distributed along pressure plate 25, lock nuts 27a fix the pushing bolts 27 in a position to define a vertically disposed linear path for carrier body 20. Its longitudinal axis A is perpendicular to support frame elements 11a and 11b.

To assemble these parts, cutting head 20 (with blade 30 removed) is spaced within slots 21 of elements 11a and 11b, which are fixed to frame elements 15a and 15b, respectively. Without pressure plates 25 in place, the outer ends of cutting head 22 rest on one inch spacer blocks (not shown) that are placed on the top of each side frame element 15a and 15b. The spacer blocks keep cutting head 20 about an inch above and parallel to the top of frame elements 15a and 15b. Cutting head 20 is at a location where it would be in its lowest cutting position when cutting through sheet stock placed on the support bed 16.

The two rear pressure plates 26 are then loosely attached to frame elements 11a and 11b with bolts 28. A tightening mechanism such as a C-clamp is then used to draw each pressure plate 26 tightly one at a time against the back of cutting head 20. Once pressure bearing surface 26a is pushing tightly against outer end portion 22, bolts 28 are then firmly tightened to secure pressure plate 26. Thus, frame elements 11a and 11b are independently tightened to end portions 22 of cutting head 20 to make cutting blade carrier 20 tight from front to back in the side frame elements 11a and 11b. There is still play and a space between each respective outer end portion 22 and recessed slot 21.

A pressure plate 25 is then dropped into each space between the end faces of end portions 22 and the bottom of recessed slots 21. Pressure plates 25 slip fit into slots 21 to preclude movement in the slots front to back with respect to assembly 10. End plates 25 are disposed down to the top of the curved portion as shown.

Handle assembly, generally designated 40, includes a threaded screw 42 having a ½ inch diameter. Cutting head crank 44 has an opening slightly smaller than the ½ inch diameter screw 42 and press fits over the top end of screw 42. A hole is then drilled to receive compression pin 43 that extends transversely to hold screw 42 in cutting head crank 44.

Handle 46 slidingly fits into a slot across the top of crank head 44 as shown and is fixed in place by screw 47. Cutting head knob 48 is rotatably disposed about a threaded bolt 49 that is fixed in place by nuts 50 on opposing sides of handle 46 as shown. The other end of screw 42 is machined to a cone-shaped configuration to fit a correspondingly shaped rod seat 29 located in bracket recess 24 of carrier body 20. Therefore, upon clockwise rotation of screw 22 in this embodiment, as is structurally evident with the engaged cone-shaped rod end bearing surface of screw 22 and shaped rod seat 29, the full downward drive force of screw 22 exerted against rod seat 29 will be transmitted with substantially equal force directed outwardly toward the end portions of carrier body 20. In other words, the cone-shaped rod end bearing surface of screw 22 and cone-shaped rod seat 29 constitute means for exerting a full drive force against carrier body 20 to transmit a substantially equal force directed outwardly toward the two opposite end portions of carrier body 20.

Screw 42 is first rotated through the tapped opening 41 in the top frame plate 13. Once screw 42 extends at least an inch below plate 13, lock nut 39 is threaded onto the bottom of screw 42. Retriever bracket 23 next is placed onto screw 42 and adjustable bearing member 45 is then threaded to screw 42. Bearing member 45 has a sleeve portion that fits through the opening of bracket 23 and has an annular bearing surface. The annular shoulder portion annularly extends outwardly from the sleeve portion and sets the annular bearing surface against the inside surface around the opening of bracket 23.

Once the outer threaded end bracket assembly is complete, top plate member 13 is secured to the top ends of side elements 11a and 11b with screws 13a. Once in place, threaded screw 42 is rotated downwardly to lower bracket 23 over recess 24 until lower holes 23a in bracket flanges are registered with a corresponding opening through which a ¼ inch bolt fixes bracket 23 to carrier body 20. Rod seat 29 is about a quarter of an inch deep and slidingly fits the cone-shaped bottom of threaded screw 42. Grease maintains the sliding friction contact between rod bearing seat 29 and the cone-shaped end of screw 42.

The sleeve portion of bearing member 45 has machined flat surfaces on opposed top sides to fit a 9/16 inch wrench. The inside threaded bearing member 45 is then rotated with a wrench upwardly along screw 42 until there is a solid sliding contact between the shoulder bearing surface of bearing member 45 and the inside surface around the opening of bracket 23.

With bracket 23 connected to carrier body 20 and bearing member 45, when handle assembly 40 rotates screw 42 clockwise, the cone-shaped bottom of screw 42 pushes downwardly against rod seating surface 29 to move carrier body 20 downwardly within slots 21. To retrieve or retract carrier body 20, handle 40 rotates screw 42 in a counterclockwise rotation and the annular shoulder bearing surface of bearing member 45 pulls upwardly against bracket 23 to retrieve carrier body 20 upwardly within slots 21. The position of bearing element 45 is adjusted along screw 42 to completely eliminate any looseness which might cause backlash associated with the up and down movement of screw 42.

Once handle assembly 40 is attached to bracket 23 as described, screw 42 is rotated counterclockwise by an amount sufficient to place the spacer blocks on the top surface of carrier body 20, which is drawn upwardly until spacer blocks rest against the bottom of top carrier plate 13. Thus, cutting blade head 20 is exactly parallel to the flat bottom of top plate 13. Tightened pressure plates 26 fix the path of movement from front to back of the assembly as blade carrier body 20 moves in a vertical linear path. When cutting blade head 20 is drawn upwardly parallel to top frame plate 13 against spacer blocks (not shown), end pressure plates 25 are next to be adjusted. Cutting blade head 20 is centered with screw 42, which establishes precision accuracy for cutting blade 30 firmly tightened to the bottom of carrier body 20.

To adjust an end pressure plate 25, pusher bolts 27 have a flat machined surface contiguously disposed to its outwardly directed surface. The flattened end surface of bolts 27 fully bear against pressure plates 25. The two center pressure bolts 27 are first finger tightened at each end of carrier body 20. Center lock nut 27a is then tightened to maintain the position of center pressure bolt 27. Next the two top bolts 27 are finger tightened and lock nuts 27a are tightened as were the center bolts.

Before tightening the bottom of the three pushing bolts 27, crank handle 46 rotates screw 42 clockwise and carrier body 20 is moved downwardly to its lowermost position. Then the two bottom push bolts 27 are finger adjusted and corresponding lock nuts 27a are tightened.

This tightening procedure provides a floating relationship between the outer ends of carrier body 20 and bearing surfaces 25a of pressure plates 25. Regardless of whether the frame elements 11a and 11b are absolutely vertical, once pressure plates 25 are in place as described, the cutting blade carrier head 20 moves in an absolutely perpendicular line with respect to any material placed on support bed 16. This structural configuration produces an absolutely vertical displacement along a perpendicular linear path for cutting blade carrier 20 without having to precisely machine side frames 11a and 11b.

In this specific embodiment, slots 21 are ½ of an inch deep, and pressure plates 25 are ¼ of an inch thick. There is a 0.025 of an inch play to adjust cutting blade carrier 20 with adjusting bolts 27 in combination with pressure plates 25.

Once carrier body 20 is firmly fixed within a linear path established by tightened pusher bolts 27, bolts 31 firmly attach cutting blade 30 to the bottom of carrier body 20. Bed 16 includes a front cutting plate 32 that operates in conjunction with cutting blade 30. Both cutting plate 32 and cutting blade 30 are composed of hardened steel. Cutting edge plate 32 is one inch wide, ¼ of an inch thick, and 6 inches long. Both cutting blade 30 and plate 32 are precision ground.

Figure 9:
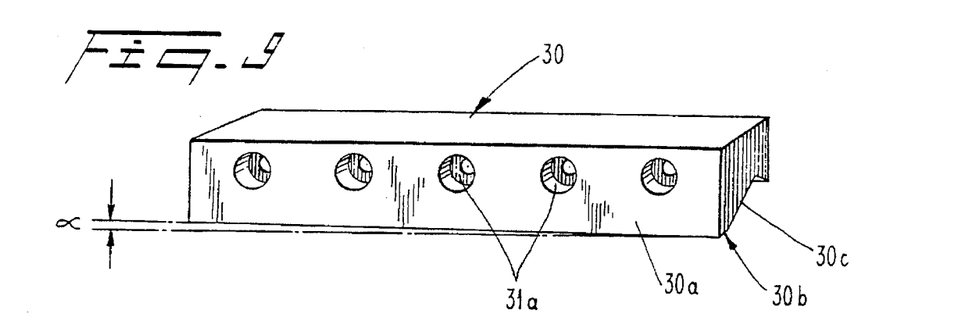
FIG. 9 is an perspective view of a cutting blade of the invention.
Figure 10:
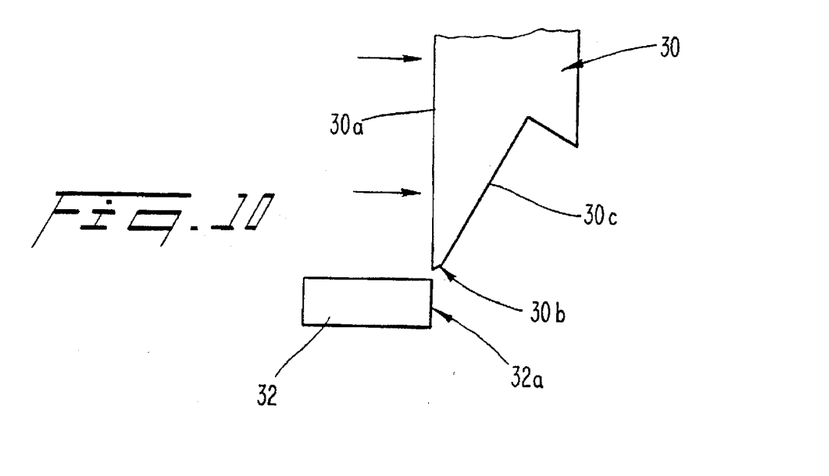
FIG. 10 is an end elevational view of the cutting blade of FIG. 9 shown in relationship to the cutting edge structure of the material support bed of the assembly of the invention.

Cutting blade 30 is designed to cut sheet material having a thickness of at least 1/16th of an inch. As shown in FIGS. 9 and 10, blade 30 has a front abutting surface 30a, a rear surface 30c tapered at 30° with respect to front surface 30a, and cutting edge 30b that slopes from one side to the other with a drop of 1/10 of an inch along its 6 inch length.

The cutting assembly of the invention is so designed to substantially eliminate any variance in effecting a cutting operation. The adjustments made during assembly of the cutting apparatus results in forward abutting surface 30a being in perfect sliding contact with cutter end contact edge 32a during a cutting operation.

Bolts 31 attach blade member 30 to blade carrier member 20 through five counter-sunk holes 31a. The tapered disposition of cutting blade edge 30b from one end of blade member 30 to the other produces a shearing effect between blade member 30 and straight contact edge 32a during a cutting stroke through the material being cut. The tapered disposition is formed by a drop of cutting edge 30b measured along 6 inches of cutting blade 30 as shown in FIG. 9 in a range of from about 1/10th to about 1/16th of an inch.

Forward abutting surface 30a is disposed at an angle of about 30 degrees with respect to rear tapered surface 30c. Both cutting blade surfaces 30a and 30c are precision ground with a surface grinder. End edge 30b is ground by hand to take off the extremely sharp point but further provides stability for cutting steel. At the same time, the quality of cut for edge 30b is maintained for softer materials such as flexible sheets of polyethylene, paper, cardstock, or rigid plastic material.

Precision Measuring System

The measuring system, generally designated 60, includes guide means for directing a measured amount of a sheet stock workpiece toward cutting blade 30. An indicator carrier arm 62 is fixedly mounted to a front traversing bar 64 and a rear traversing bar 66. A precision threaded drive screw 65 has 16 threads per inch. Therefore, every time there is a full rotation of screw 65, indicator carrier arm 62 moves exactly 1/16th of an inch. A circumferential scale 72 has a circumferential zero point and circumferential marks are spaced 0.001 of an inch with respect to each other around the circumferential dial. One sixteenth of an inch is 62.5 thousandths of an inch. One eighth of an inch is 125 thousandths. The distance between each mark on circumferential scale 72 represents one thousandths of an inch of linear movement of indicator carrier arm 62 along the length of precision threaded screw 65.

Measuring crank handle 74 is secured in a slot on the outer end of measuring crank 70 bearing circumferential scale 72. Crank knob 76 is rotatably mounted at the outer end of crank handle 74 for effecting rotation about the longitudinal axis of threaded screw 65, which is mounted to base frame element 15a with support brackets 61 and 63. Lock nuts 67 fix the adjustable bearing knob 68 at the rear end of screw 65, and the circumferential measuring crank 70 at the front of the measuring assembly.

Figure 2:
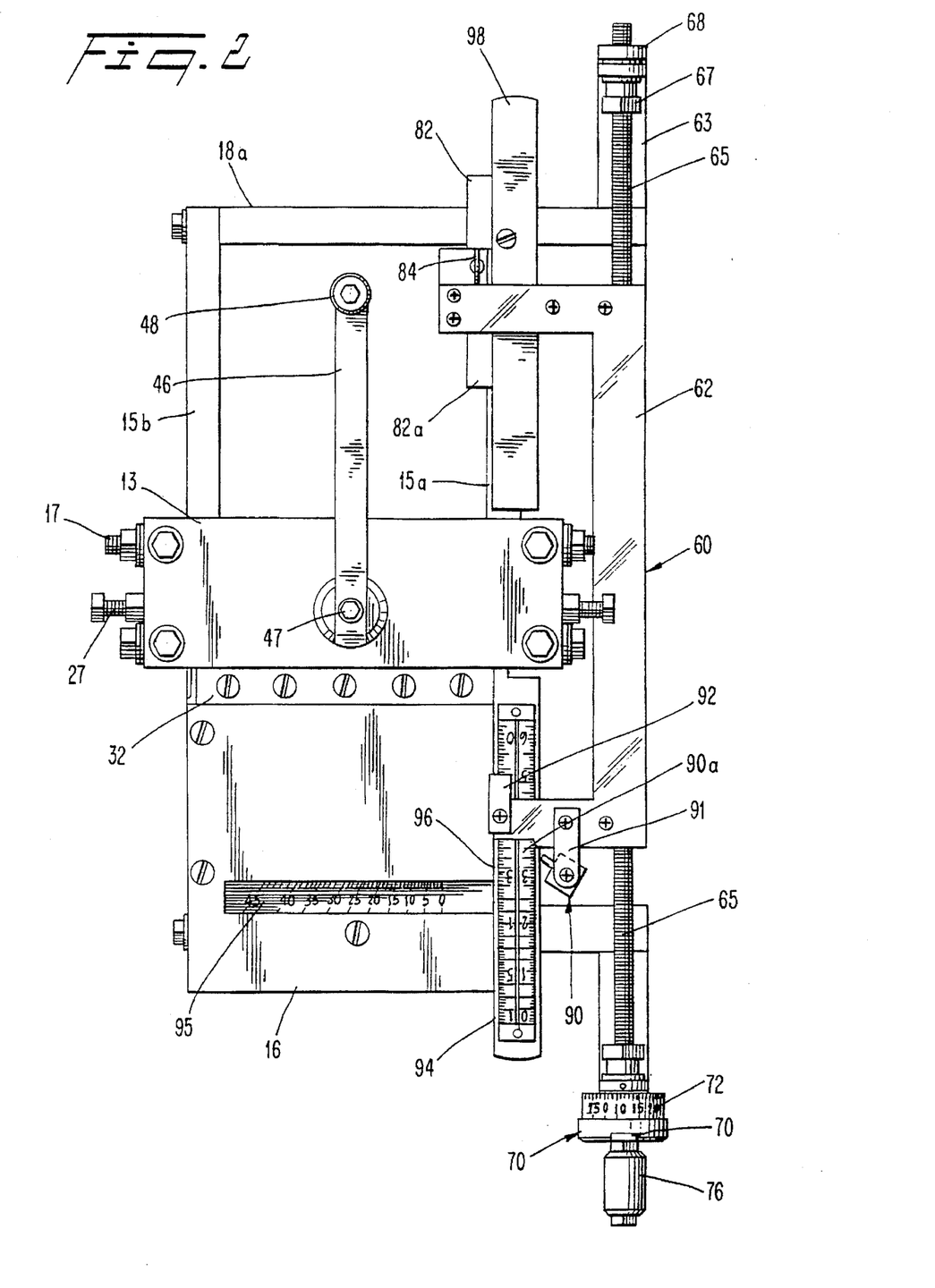
FIG. 2 is a top plan view of a first embodiment of a measuring and cutting assembly according to the invention with the cutting head handle shown extending parallel to the longitudinal axis of the frame structure.
Figure 3:
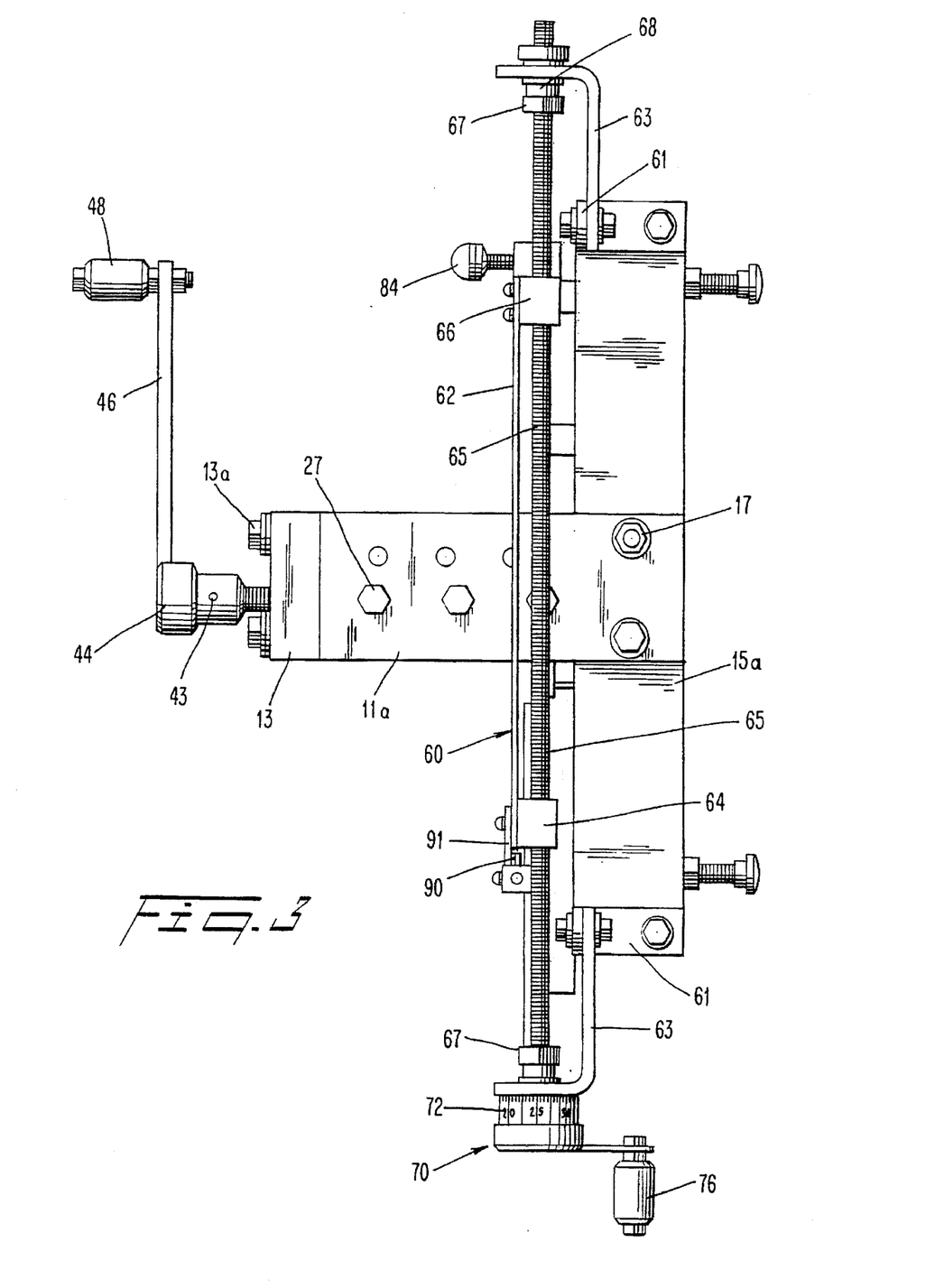
FIG. 3 is a right side elevational view of the assembly of FIG. 2.
Figure 4:
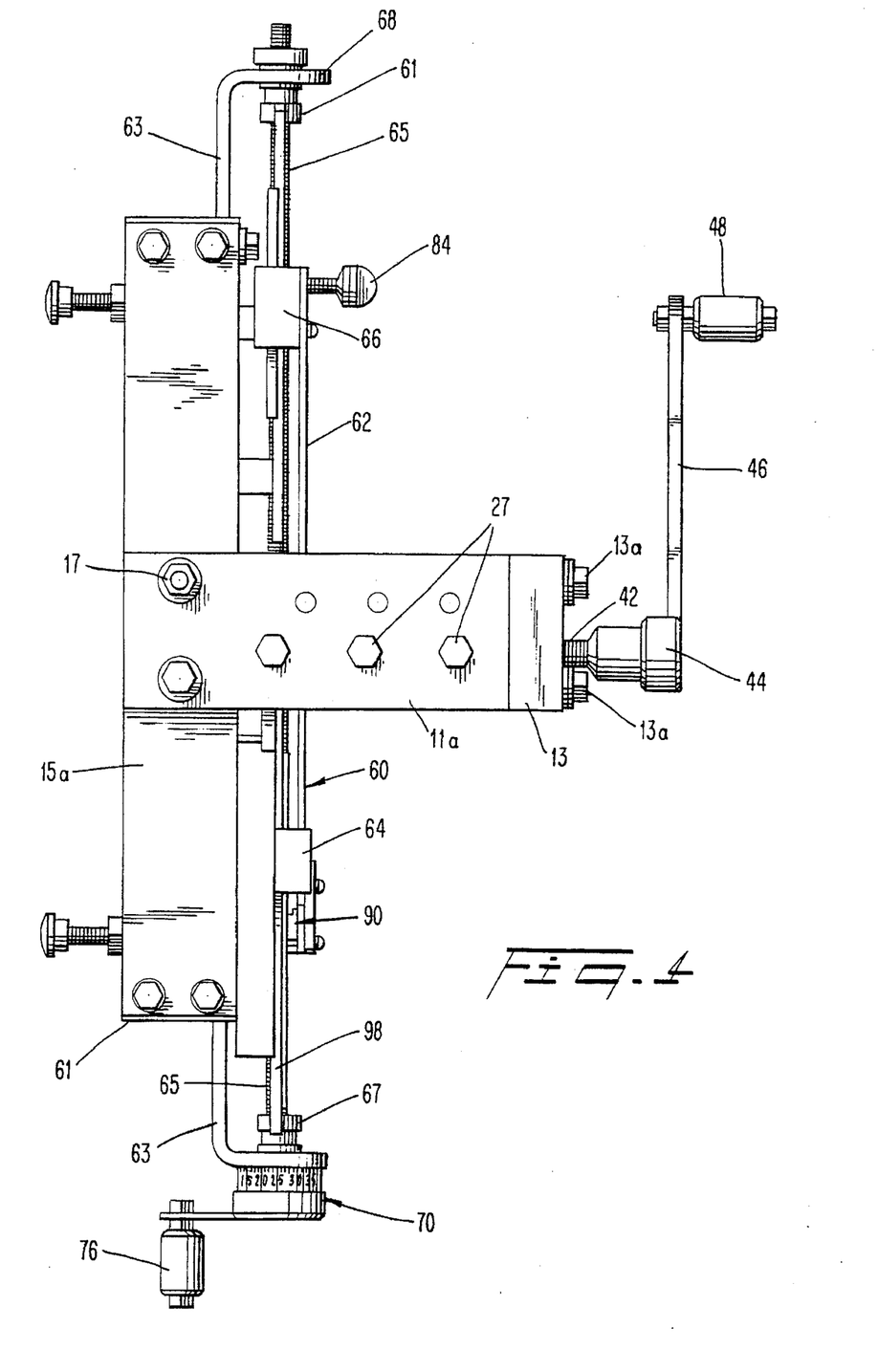
FIG. 4 is a left side elevational view of the assembly of FIG. 2.
Figure 5:
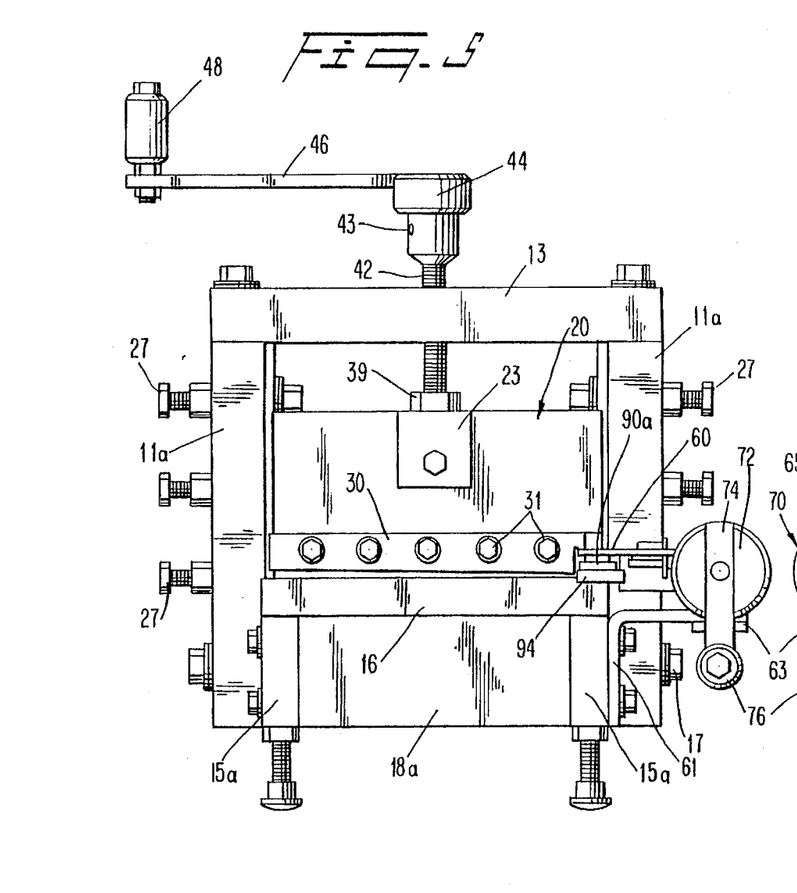
FIG. 5 is a front elevational view of the assembly of FIG. 2 with the cutting head handle shown extending in a direction perpendicular to the longitudinal axis of the frame structure.
Figure 6:
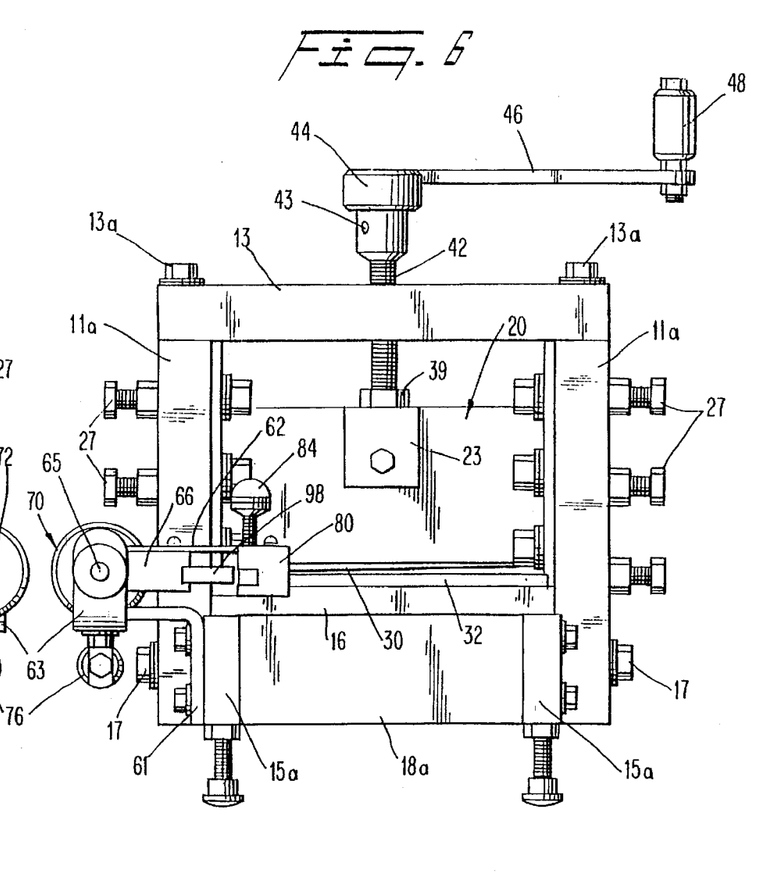
FIG. 6 is a rear elevational view of the assembly of FIG. 2 with the cutting handle shown extending in a direction 180 degrees from the position shown in FIG. 5.

In FIG. 2, indicating element 90 is mounted to the front L portion of indicator carrier member 62. Front stock abutment stop 92 is mounted to the outer end of the front L portion of indicator carrier member 62. A double scale member 94 is mounted on the top of guide bar member or element 96 fixedly disposed on a first side of cutting blade 30. Double scale 94 includes a left-hand scale for measurements in front of cutting blade 30 with a zero point closest to the cutting blade and a right-hand scale for measurements behind cutting blade 30 with the zero point close to the outer end of double scale 94.

In this embodiment, double scale 94 is divided into 16ths of an inch. One sixteenth of an inch is the distance threaded screw 65 moves the wire indicating element 90a along the length of scale member 94 with each complete turn of crank 74 and threaded screw 65.

With this measuring arrangement, double scale 94 is not used to visually make measurements. It is used to pre-count, identify, and locate each complete turn of the dial on the measuring crank 70. For example, to set a known measuring system to cut a piece of flat stock 3.275 inches long, it will take 52 complete turns of the crank, plus 25 more thousandths. This would give the desired 3.275 of an inch measurement. It is very easy to lose track of counting the 52 crank rotations.

With the present invention, however, the double scale 94 has pre-counted and located the 52 turns at 3 and ¼ inches on linear scale 94. The first course reading visually sets pointer 90a exactly at 3 and ¼ inches. The circumferential scale 72 must be checked to make sure it is on zero. Crank 70 is then rotated 25 thousandths more as determined by circumferential scale 72. The cutting device is now set to make the required 3.275 of an inch cut.

If a sheet of stock material abuts against the end 82a of rear abutment member 82 before cutting, the 3.275 inch measurement is made from the zero point on the right-hand scale. The 3.275 inch measurement is made from the zero point on the left-hand scale if a sheet stock material is measured from the front abutment member 92 to the cutting edge 32a.

Using the measuring system of this invention, regardless of how long the scale 94 is or what size screw 65 is, any measurement can be visually located to within one turn of the crank without ever counting turns of the screw.

In this specific embodiment, the measuring crank circumferential scale 72 has three functions. With the zero point set on the notch at the top of the measuring device, scale 72 locates each complete turn of crank 70 and thus, screw 65. Secondly, the 62 and one half circumferential equal spaces between indicating marks around the circumference divides each complete rotation into 62 and one half thousandths of an inch because screw 65 has 16 threads to an inch. If screw 65 had 10 threads to an inch, then each revolution of crank 70 would produce a linear movement of 100 thousandths of an inch (⅒oth of an inch) along linear scale 94.

The vital relationship existing in the measuring system of this invention is that the linear scale 94 includes a plurality of measuring or rotation counting marks laterally spaced with respect to each other by a predetermined amount that corresponds to a complete rotation of threaded rod 65. Said another way, each linearly spaced measuring or rotation counting mark measures a preselected distance equal to a complete rotation of drive screw 65. Moreover, the spaced circumferential marks on crank scale 72 divides each ⅟16th of an inch on double scale 94 into 62.5 thousandths of an inch.

Stock Guide Assembly

Rear stock abutment member 82 is adjustably mounted in an abutment member holder 80 that is fixedly secured at the outer end of the rear L portion of indicator carrier element 62. Thumb tightening screw 84 is used to fix slidably disposed abutment member 82 in place within the edge groove or channel formed in abutment member holder 80.

One side of front guide element 96 includes a sheet stock abutment surface, which faces across the top surface of supporting bed 16. The other side of guide element 96 fits into the edge groove or channel of traversing block 64. Rear guide element 98 is fixedly mounted to base frame element 15a and fits into the edge groove or channel of rear traversing block 66.

The outer right-hand zero point of double scale 94 is used to measure the distance between cutting edge 32a and the outer end of rear abutment member 82. The left-hand side of the double scale 94 measures the distance from the front face of the front abutting surface 30a of the cutting blade 30 and the inner end of the front abutment member 92 or 92a as shown in FIGS. 2 and 7, respectively.

The indicating element 91 shown in FIG. 7 is fixed to indicating carrier arm 62 and is disposed along the center line of double scale 94 with outwardly directed wire elements 90b that designate a specific location on both sides of linear scale 94.

Five bolts fix the front cutting plate 32 to the top of the supporting bed 16. An angular measuring scale 95 on bed 16 is disposed perpendicular to guide element 96 and measures a particular angle with respect to the cutting edge 32a along an angle degree stop guide 100 that rotates about a fastening pivot member 101. Stop guide knob 102 located at the outer end of stop guide 100 facilitates its rotation about pivot member 101. Stop guide 100 pivots outwardly away from guide member 96 along angle degree measuring scale 95 and provides an abutting guide surface for cutting angles on contiguously placed sheet stock up to 45 degrees with respect to cutting edge 32a.

With the measuring system of the invention, the operator never needs to make a mistake. Each complete rotation of the threaded screw 65 is identified as a spaced measuring mark on the linear scale 94. Fine measurement is required only to determine how many thousandths of an inch the linear indicating elements 90a or 90b moves between the measuring marks on linear scale 94.

Backlash Prevented In Measuring System

By a combination of lock screws 67 on ⅜-16 precision threaded screw 65 and stabilizer or carrier arm 62, backlash is eliminated from the disclosed measuring system. Backlash is common when moving a member having a threaded bore along a threaded rod member. The desired result is that when crank 76 is moved 5 circumferential marks to the right, indicating element 90a will move 5 thousandths of an inch. When crank 76 is moved back 5 marks to the left, indicating element 90a will move back to its original position. Any play between the threads of rod 65 and the bores of traversing members 64 and 66 whereby crank 76 is rotated without causing linear movement of element 90a is called backlash.

Any backlash would destroy the accuracy of the disclosed measuring system unless all measurements were made by turning the crank in only one direction. The existence of such play between threads on threaded screw 65 and the inside threaded bores of traversing members 64 and 66, however, would not work because double scale 94 measures in two directions.

Normally, when rotating a threaded screw clockwise into a threaded hole, any part threadingly engaged to the part moves in one direction along the threaded screw. Upon stopping and rotating the threaded screw counterclockwise without moving the member having a bore would destroy the accuracy of the scales on the measuring device.

Such backlash is prevented by the indicator carrier arm 62 being attached to front and rear traversing bars 64 and 66, which effect movement of carrier arm 62 along threaded drive screw 65. Front traversing bar 64 is attached to indicator arm 62 at a slight angle to 90 degrees with respect to the longitudinal axis of threaded measuring screw 65. This slight angle removes any play between the inner threads of front traversing bar 64 and outside threads of screw 65.

Any front to back play between bearing crank 70 or adjustable bearing 68 and brackets 63 would cause backlash in rotating screw 65. For this reason, lock nuts 67 are loosened and adjustable bearing 68 is turned to the right until all play is removed between threaded screw 65 and brackets 63. Lock nuts 67 are re-tightened once adjustment of bearing 68 is complete.

Adjustable bearing 68 also provides a second function in the measuring system of the invention. When locating measurements, it is necessary that crank 70 remains at any position just located. If crank 70 turns too freely, the weight of crank handle 76 could change this location. Adjustable bearing 68 allows the user to keep a desired pressure on crank 70 throughout the entire life of adjustable bearing 68.

Advantage of the Invention

The hobby industry is limited presently to a cutting method whereby the tools include a pair of tin snips, a straight edge or ruler depending on the eyesight of the user, a vise, a file, an Exacto® knife blade, a razor blade, a jeweler's saw, and sandpaper. The apparatus of the present invention includes a hand-manipulated crank member for moving a blade carrier body 20 with an extremely significant mechanical advantage due to the length of crank handle 48 and a ½ of an inch diameter drive screw 12 with the desired thread slope to gain the mechanical advantage.

In this embodiment, 10 pounds of force exerted at the end of crank handle 46 will produce a downward force on the cutting blade carrier body 20 of about 3,000 pounds. The amount of mechanical advantage is a function of the length of handle 46 and the pitch of the threads of drive screw 12. Such a calculation is well known.

This mechanical advantage together with the sloped nature from one end to the other of cutting blade 30 provides a shearing force that enables the operator to cut a rigid metal sheet having a thickness of at least 1/16th of an inch without causing any curl to form in the segments being severed from the sheet stock material.

The cutting assembly of this invention is designed to cut, steel, brass, aluminum, and copper up to at least 1/16th of an inch. At the same time, the combination of cutting blade 30 and cutting edge 32 is effective to clearly cut flexible sheet material such as paper, flexible plastic, and foam plastic such as Styrene.

The apparatus of this invention provides a lightweight, portable machine that may be transported by a single person and yet incorporates the rigidity and precision of cutting and measuring found in much larger machines.

Using moderate force on the 6 inch long handle 46, the cutting assembly of this specific embodiment of the invention is designed to cut 0.015 inch steel, 0.020 inch brass, 0.025 inch aluminum and copper, and all other materials softer than metal up to about 1/16th of an inch thick. With the ability to exert considerably more manual force depending on the strength of the person using the assembly of the invention, it is contemplated that a rigid metal thickness of double that achieved for a moderate manual force could be accomplished for each of the metals. With a machine driven screw, the size of the cutting machine would be increased to cut greater thicknesses of metal sheet stock.

The apparatus can effect work on a workpiece at both the front and the rear of a tool location as may be required. The tool in the disclosed specific embodiment is a cutting blade carried by a carrier body that moves up and down through a cutting zone to cut sheet stock.

A cutting machine according to this invention performs the desired work operation on a workpiece without the necessity of a workpiece clamp. Moreover, a precision measuring system includes an indicator carrier arm that is mounted to operate without any backlash.

While the precision measuring and cutting assembly and method have been shown and described in detail, it is obvious that this invention is not to be considered as limited to the exact form disclosed, and that changes in detail and construction may be made therein within the scope of the invention without departing from the spirit thereof.

Having thus set forth and disclosed the nature of this invention, what is claimed is:

1. A precision cutting assembly for cutting material having a thickness, said assembly comprising:
    a) frame means including two laterally spaced elongated frame members, material support means having a cutting edge structure and being mounted to the frame means, and cutter means for cutting material which is disposed on the material support means,
    b) the cutter means including cutting blade carrier means and cutting blade means mounted to said cutting blade carrier means, said cutting blade carrier means having a longitudinal axis extending between two outer end portions of the cutting blade carrier means,
    c) the cutting blade carrier means is movably mounted to the frame means for moving along a linear path defined between said elongated frame members,
    d) pressure producing means disposed on said frame means for adjustably applying pressure from a said elongated frame member against an outer end portion of the cutting blade carrier means, and said pressure producing means adjustably transmits pressure toward said outer end portion of the cutting blade carrier means in a direction parallel to the longitudinal axis of said cutting blade carrier means, and
    e) drive means for moving the cutting blade carrier means along the linear path during a cutting operation into and out of a cutting zone located adjacent the cutting edge structure,
    f) the cutting blade carrier means causing the cutting blade means to precision cut segments from material disposed over the cutting edge structure when moving through the cutting zone defined by the thickness of the material being cut.

2. An assembly as defined in claim 1 wherein
    the material support means includes flat plate means for supporting material being cut and indicator guide means for directing a measured amount of the material to be cut toward the cutting blade means.

3. An assembly as defined in claim 2 wherein
    said indicator guide means includes indicator means, indicator carrier means, and elongated linear scale means,
    said indicator carrier means includes precision threaded rod means rotatably mounted to the frame means for moving the indicator means a predetermined amount along the linear scale means for each rotation of the threaded rod means,
    said linear scale means includes a plurality of measuring marks laterally spaced to designate said predetermined amount for each complete rotation of the threaded rod means from a zero linear starting point.

4. An assembly as defined in claim 3 wherein said indicator carrier means includes rod rotating means for rotating the threaded rod means about a fixed axis of rotation, said rod rotating means includes a circumferential scale having a zero circumferential point and a plurality of marks spaced with respect to each other by a circumferential amount which designates a predetermined linear amount of movement of the indicator means along the linear scale means.

5. An assembly as defined in claim 4 wherein said circumferential amount of movement between spaced marks on the circumferential scale measures an amount equal to one thousandth of an inch along the linear scale means.

6. An assembly as defined in claim 3 wherein said indicator carrier means includes rod rotating means for rotating the threaded rod means about a fixed axis of rotation, and said indicator means includes an indicating element which identifies a particular location on the linear scale means that corresponds to the number of rotations of the threaded rod means with respect to the linear and circumferential zero points.

7. An assembly as defined in claim 6 wherein said rod rotating means includes circumferential scale means for determining the amount of linear movement of the indicating element between measuring marks on the linear scale means.

8. An assembly as defined in claim 1 wherein the frame means includes base frame means mounted to the two laterally spaced elongated frame members and having tension rod means for urging the two elongated frame members toward each other.

9. An assembly as defined in claim 1 wherein the assembled frame means, material support means, cutter means, pressure producing means, and drive means have a structural configuration effective to be portable by a single individual.

10. An assembly as defined in claim 1 wherein said pressure producing means includes means for adjusting said pressure from said frame means along said cutting blade carrier means.

11. An assembly as defined in claim 10 wherein said means for adjusting said pressure includes pushing means urging floating pressure plate means against said cutting blade carrier means in said direction parallel to the longitudinal axis of said cutting blade carrier means.

12. A precision cutting assembly for cutting material having a thickness, said assembly comprising:

a) frame means including two laterally spaced elongated frame members, material support means having a cutting edge structure and being mounted to the frame means, and cutter means for cutting material which is disposed on the material support means, b) the cutter means including cutting blade carrier means, cutting blade means mounted to said cutting blade carrier means, said cutting blade carrier means having a longitudinal axis, c) the cutting blade carrier means is movably mounted to the frame means for moving along a linear path defined between said elongated frame members, d) pressure producing means disposed on said frame means for adjustably applying pressure from a said elongated frame member against the cutting blade carrier means to hold the cutting blade carrier means within precise parallel limits of movement along said linear path, and e) drive means for moving the cutting blade carrier means along the linear path during a cutting operation into and out of a cutting zone located adjacent the cutting edge structure, f) the cutting blade carrier means causing the cutting blade means to precision cut segments from material disposed over the cutting edge structure when moving through the cutting zone defined by the thickness of the material being cut, g) said pressure producing means including pressure plate means floatingly and contiguously juxtaposed the cutting blade carrier means and pushing means for urging the pressure plate means for transmitting pressure toward and against the cutting blade carrier means in a direction parallel to the longitudinal axis of the cutting blade carrier means.

13. An assembly as defined in claim 12 wherein the frame means includes base frame means for supporting elongated frame members, and said two laterally spaced elongated frame members are mounted to opposing sides of said base frame means, the cutting blade carrier means includes a carrier body and said cutting blade means is secured to said carrier body having two outer end portions mounted for sliding contact with respective frame members back and forth along the linear path.

14. An assembly as defined in claim 13 wherein the linear path has a vertical disposition and the material support means horizontally supports the material being cut, a said elongated frame member includes pressure bearing surface means, and said pressure plate means is disposed against pressure bearing surface means of said elongated frame member and contiguous to the carrier body for applying said pressure against the carrier body and in a direction perpendicular to the vertical disposition of the linear path.

15. An assembly as defined in claim 13 wherein a said elongated frame member includes pressure bearing surface means, the carrier body has a longitudinal axis which is perpendicular to the elongated frame members, and said pressure plate means is disposed against said pressure bearing surface means of said elongated frame member and is contiguous to the carrier body for applying said pressure against the carrier body in a first direction perpendicular to the longitudinal axis of the carrier body and in a second direction parallel to the longitudinal axis of the carrier body.

16. An assembly as defined in claim 13 wherein each of the elongated frame members includes guide slot means which receives a respective outer end portion of the carrier body which has a longitudinal axis that is perpendicular to the elongated frame members.

17. An assembly as defined in claim 12 wherein said frame means includes base frame means providing support for said material support means and having horizontally disposed side base frame elements, the elongated frame members are vertically disposed and each has a longitudinal axis, a bottom end portion fixedly secured to respective side base frame elements, and a top end portion fixedly secured to a top carrier support frame member, each said frame member includes guide slot means having a recessed slot extending parallel to the longitudinal axis of each elongated frame member, the recessed slot has a depth that is less than the thickness of the elongated frame member, a width sufficient to contain an outer end portion of said cutting blade carrier means, and an upper end opening to receive said outer end portion of the cutting blade carrier means into the recessed slot, said pressure plate means includes a first fixedly secured plate member and a second freely plate disposed member, said first and second plate members having respective first and second pressure bearing surfaces contiguous to a carrier outer surface portion at each end of said cutting blade carrier means, a said first plate member is fixedly secured to each of the elongated frame members adjacent the recessed slot for a said first pressure bearing surface to apply said pressure against a first surface of said cutting blade carrier means and in a direction perpendicular to the longitudinal axis of said cutting blade carrier means, and a said second plate member is disposed in a said recessed slot to apply said pressure against a second surface of said cutting blade carrier means and in said direction parallel to the longitudinal axis of said cutting blade carrier means.

18. An assembly as defined in claim 1 wherein
said frame means includes base frame means, and
said elongated frame members are laterally spaced with respect to each other on the base frame means,
the cutting blade carrier means includes a carrier body having a cutting blade carrying portion and two outer end portions mounted for sliding contact with respective elongated frame members,
the cutting blade means includes an elongate cutting blade member fixedly secured to the cutting blade carrying portion facing the material support means and having a length extending parallel to the longitudinal axis of the carrier body.

19. An assembly as defined in claim 18 wherein
said cutting edge structure includes a cutter end contact edge against which the cutting blade member passes during the cutting operation, and
the cutting blade member has a cutting blade edge and a forward abutting surface which is in sliding contact with the cutter end contact edge during the cutting operation.

20. An assembly as defined in claim 19 wherein
said cutting blade edge is in a tapered disposition from one end of the blade member to the other to effect a shearing effect with respect to said cutter end contact edge during a cutting stroke through the material being cut.

21. An assembly as defined in claim 20 wherein
said cutting blade edge is straight and the tapered disposition is formed by one end of said edge being lower than another end of said edge by an amount in a range of about 1/10 to about 1/16 of an inch measured along 6 inches of said cutting blade edge.

22. An assembly as defined in claim 1 wherein
said drive means includes an elongate drive rod member having a rod end bearing surface and precision threaded outer surface means, said precision threaded outer surface being located intermediate a coupling end portion operatively connected to the cutting blade carrier means and a rotation drive end portion connected to rotation activating means, and the frame means includes base frame means and top carrier support frame means mounted above said base frame means, said top carrier support frame means includes a threaded bore having a precision threaded inner surface means for engaging said precision threaded outer surface means and a longitudinal axis which extends through the top carrier support frame means, said threaded bore being disposed in a direction parallel to the linear path, the coupling end portion of the drive rod member includes coupling bearing means for engaging bracket means mounted to the cutting blade carrier means to move the blade carrier means back and forth along the linear path, the coupling bearing means includes a coupling bearing member having a tubular section with an inner bore surface threadingly engaged with precision threads on the threaded drive rod member and with lock nut means for securing the coupling bearing member at a fixed location on the threaded drive rod member, said tubular section includes an outer annular flange portion which carries the bracket bearing surface means in contact with said bracket means, and during the cutting operation, said rod end bearing surface pushes the blade carrier means in a cutting direction toward the cutting edge structure and said bracket bearing surface means pulls against the bracket means in a retrieving direction away from the cutting edge structure.

23. An assembly as defined in claim 22 wherein
said cutting blade carrier means includes a carrier body having a bracket recess means with the bracket means fixedly disposed thereover,
said bracket recess means includes said rod end bearing receiving surface and has a structural configuration to receive the outer annular flange portion of the coupling bearing member.

24. A precision cutting assembly for cutting material having a thickness, said assembly comprising:

a) frame means including two laterally spaced elongated frame members, material support means having a cutting edge structure and being mounted to the frame means, and cutter means for cutting material which is disposed on the material support means, b) the cutter means including cutting blade carrier means and cutting blade means mounted to said cutting blade carrier means, said cutting blade carrier means having a longitudinal axis extending between two outer end portions of the cutting blade carrier means, c) the cutting blade carrier means is movably mounted to the frame means for moving along a linear path defined between said elongated frame members, d) pressure producing means disposed on said frame means for adjustably applying pressure from a said elongated frame member and transmits said pressure against an outer end portion of the cutting blade carrier means, and e) drive means for moving the cutting blade carrier means along said linear path during a cutting operation into and out of a cutting zone located adjacent the cutting edge structure, f) said drive means including means for exerting a full drive force against said cutting blade carrier means to transmit a substantially equal force directed outwardly toward said two outer end portions, g) the cutting blade carrier means causing the cutting blade means to precision cut segments from material disposed over the cutting edge structure when moving through the cutting zone defined by the thickness of the material being cut.

25. A precision cutting assembly for cutting material having a thickness, said assembly comprising:

a) frame means including two laterally spaced elongated frame members, material support means having a cutting edge structure and being mounted to the frame means, and cutter means for cutting material which is disposed on the material support means, b) the cutter means including cutting blade carrier means and cutting blade means mounted to said cutting blade carrier means, said cutting blade carrier means having a longitudinal axis, c) the cutting blade carrier means is movably mounted to the frame means for moving along a linear path defined between said elongated frame members, d) pressure producing means disposed on said frame means for adjustably applying pressure from a said elongated frame member against the cutting blade carrier means to hold the cutting blade carrier means within precise parallel limits of movement along said linear path, and e) drive means for moving the cutting blade carrier means along the linear path during a cutting operation into and out of a cutting zone located adjacent the cutting edge structure, f) the cutting blade carrier means causing the cutting blade means to precision cut segments from material disposed over the cutting edge structure when moving through the cutting zone defined by the thickness of the material being cut, g) said two laterally spaced elongated frame members each having a lower end portion mounted to said base frame means and a top end portion mounted to a top carrier support frame structure, h) the drive means including elongate drive rod means having precision threaded outer surface means intermediate a coupling end portion operatively connected to the cutting blade carrier means and a rotation drive end portion connected to rotation activating means for rotating said drive rod means, and i) the top carrier support frame structure including a threaded bore having a precision threaded inner surface means for engaging the precision threaded outer surface means of the drive means and a longitudinal axis which extends through the top carrier support frame structure and is disposed in a direction parallel to the linear path.

26. An assembly as defined in claim 25 wherein said rotation activating means includes manually operated handle means fixedly connected to the rotation drive end portion for rotating the drive rod means through the threaded bore of the top carrier support frame structure.

27. An assembly as defined in claim 25 wherein said coupling end portion of the drive rod means includes coupling bearing means for engaging the cutting blade carrier means to move the blade carrier means back and forth along the linear path.

28. An assembly as defined in claim 27 wherein said drive rod means includes an elongate drive rod member having a shaped rod end bearing surface located at a free coupling end of the drive rod member and in frictional engagement with a corresponding opposed rod end bearing receiving surface which is disposed on the blade carrier means, said coupling end portion includes bracket bearing surface means engaging bracket means of the blade carrier means, and during the cutting operation, said rod end bearing surface pushes the blade carrier means in a cutting direction toward the cutting edge structure and said bracket bearing surface means pulls against the bracket means in a retrieving direction away from the cutting edge structure.

29. A precision cutting assembly for cutting material having a thickness, said assembly comprising:

a) frame means including two laterally spaced elongated frame members, material support means having a cutting edge structure and being mounted to the frame means, and cutter means for cutting material which is disposed on the material support means, b) the cutter means including cutting blade carrier means and cutting blade means mounted to said cutting blade carrier means, c) the cutting blade carrier means is movably mounted to the frame means for moving along a linear path defined between said elongated frame members, d) pressure producing means disposed on said frame means for adjustably applying pressure from a said elongated frame member against the cutting blade carrier means to hold the cutting blade carrier means within precise parallel limits of movement along said linear path, and e) drive means for moving the cutting blade carrier means along the linear path during a cutting operation into and out of a cutting zone located adjacent the cutting edge structure, f) the cutting blade carrier means causing the cutting blade means to precision cut segments from material disposed over the cutting edge structure when moving through the cutting zone defined by the thickness of the material being cut, g) said material support means including indicator guide means and abutment means, h) said indicator guide means includes first guide element means fixedly disposed on a first side of the cutting blade means for directing a measured amount of the material to be cut past the cutting blade means, and i) said abutment means being located on a second side of the cutting blade means opposite said first side for limiting movement of the material past the cutting blade means to define the measured amount of the material to be cut between the abutment means and the cutting blade means.

30. An assembly as defined in claim 29 wherein said indicator guide means includes linear indicating means, indicator carrier means, precision threaded rod means, and elongated linear scale means, said linear indicating means mounted to the indicator carrier means on said first side of the cutting blade means and the abutment means mounted to the indicator carrier means on said second side of the cutting blade means, said precision threaded rod means is rotatably mounted to the frame means for moving the indicator carrier means with said linear indicating means a selected distance along the linear scale means to cause the linear indicating means and abutment means to move in tandem when the threaded rod means turns about a fixed axis of rotation.

31. An assembly as defined in claim 30 wherein said indictor carrier means includes adjustment means mounted to variably set the location of the abutment means with respect to the cutting blade means.

32. An assembly as defined in claim 29 wherein the cutting blade means includes a blade member having a straight cutting edge extending in a direction perpendicular to the linear path, said first guide element includes a first material abutting surface which extends in a direction perpendicular to the cutting edge, and the abutment means includes a second material abutting surface which extends in a direction parallel to the cutting edge.

33. A precision cutting assembly for cutting material having a thickness, said assembly comprising:

a) frame means, material support means having a cutting edge structure and being mounted to the frame means, and cutter means for cutting material which is disposed on the material support means, b) the cutter means including cutting blade carrier means and cutting blade means mounted to said cutting blade carrier means, c) the cutting blade carrier means is mounted to the frame means for moving along a linear path, d) pressure producing means for contiguously holding the cutting blade carrier means within precise parallel limits of movement along said linear path, and e) drive means for moving the cutting blade carrier means along the linear path during a cutting operation into and out of a cutting zone located adjacent the cutting edge structure, f) the cutting blade carrier means causes the cutting blade means to precision cut segments from material disposed over the cutting edge structure when moving through the cutting zone defined by the thickness of the material being cut, g) the frame means including base frame means and two laterally spaced carrier support frame structures each having a lower end portion mounted to said base frame means and a top end portion mounted to a top carrier support frame structure, h) the drive means including elongate drive rod means having precision threaded outer surface means intermediate a coupling end portion operatively connected to the cutting blade carrier means and a rotation drive end portion connected to rotation activating means, and i) the top carrier support frame structure including a threaded bore having a precision threaded inner surface means for engaging the precision threaded outer surface means of the drive means and a longitudinal axis which extends through the top carrier support frame structure and is disposed in a direction parallel to the linear path, j) the rotation activating means includes manually operated handle means fixedly connected to the rotation drive end portion for rotating the drive rod means through the threaded bore of the top carrier support frame structure, k) the coupling end portion of the drive rod means includes coupling bearing means for engaging the cutting blade carrier means to move the blade carrier means back and forth along the linear path, l) the drive rod means including an elongate drive rod member having a shaped rod end bearing surface located at a free coupling end of the drive rod member and in frictional engagement with a corresponding opposed rod end bearing receiving surface which is disposed on the blade carrier means, m) the coupling bearing means having a bracket bearing surface means engaging bracket means of the blade carrier means, and n) during the cutting operation, said rod end bearing surface pushes the blade carrier means in a cutting direction toward the cutting edge structure and said bracket bearing surface means pulls against the bracket means in a retrieving direction away from the cutting edge structure, o) the coupling bearing means including a coupling bearing member having a tubular section with an inner bore surface threadingly engaged with precision threads on the threaded drive rod member and with lock nut means for securing the coupling bearing member at a fixed location on the threaded drive rod member, p) said tubular section including an outer annular flange portion which carries the bracket bearing surface means in contact with said bracket means.

34. An assembly as defined in claim 33 wherein the cutting blade carrier means includes a carrier body having a bracket recess means with the bracket means fixedly disposed thereover, said bracket recess means includes said rod end bearing receiving surface and has a structural configuration to receive the outer annular flange portion of the coupling bearing member.

* * * * *